(12) United States Patent
Sasaki et al.

(10) Patent No.: US 6,504,999 B2
(45) Date of Patent: Jan. 7, 2003

(54) CAMERA WITH PRINTER

(75) Inventors: Hidemi Sasaki, Saitama (JP); Keizo Uchioke, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/968,666

(22) Filed: Oct. 2, 2001

(65) Prior Publication Data

US 2002/0039488 A1 Apr. 4, 2002

(30) Foreign Application Priority Data

Oct. 2, 2000 (JP) ........................................ 2000-301792
Jan. 26, 2001 (JP) ........................................ 2001-018981

(51) Int. Cl.[7] .................. G03B 17/50; G03B 17/48; G03B 5/02
(52) U.S. Cl. .................... 396/30; 396/349; 396/429; 358/909.1
(58) Field of Search ........................ 396/30, 31, 32, 396/33, 34, 348, 349, 517, 518; 358/906, 909.1

(56) References Cited

U.S. PATENT DOCUMENTS

| | | | | |
|---|---|---|---|---|
| 3,712,198 A | * | 1/1973 | Nerwin | 396/348 |
| 4,261,658 A | * | 4/1981 | Uchiyama et al. | 396/178 |
| 4,262,301 A | * | 4/1981 | Erlichman | 358/303 |
| 5,606,420 A | * | 2/1997 | Maeda et al. | 355/21 |
| 5,742,861 A | * | 4/1998 | Stephenson | 358/906 |
| 5,822,637 A | * | 10/1998 | Stephenson | 358/906 |
| 6,262,757 B1 | * | 7/2001 | Masubuchi et al. | 347/225 |
| 6,304,725 B2 | * | 10/2001 | Kitagawa et al. | 396/159 |
| 6,356,712 B1 | * | 3/2002 | Motomura et al. | 396/32 |

FOREIGN PATENT DOCUMENTS

JP      11-249233 A      9/1999

\* cited by examiner

*Primary Examiner*—Alan A. Mathews
(74) *Attorney, Agent, or Firm*—Sughrue Mion, PLLC

(57) ABSTRACT

An electronic still camera of a printer built-in type is provided, in which an instant photo film pack for containing an instant photo film is used. A pack loading chamber is loaded with the instant photo film pack. A front opening is provided, through which the pack loading chamber is open in a forward direction. A taking lens is adapted for focusing of an image of an object to be photographed. A lens barrel accommodates the taking lens, is disposed to extend in the forward direction from the pack loading chamber, has a barrel rear end, and is inserted in the front opening. The barrel rear end is disposed in the pack loading chamber.

18 Claims, 15 Drawing Sheets

CAMERA WITH PRINTER

BACKGROUND OF THE INVENTION

1. Field of the Invention

The present invention relates to a camera with a printer. More particularly, the present invention relates to a camera with a printer in which a pack for containing recording media is used, and which is constructed with a reduced size.

2. Description Related to the Prior Art

An instant camera is known in the field of optical instruments, and is used with a mono-sheet type of instant photo film, or other sheet-shaped recording medium. Also, JP-A 11-249233 discloses a printer built-in type of electronic still camera. An instant photo film pack contains ten or more instant photo films, of which an uppermost one is subjected to exposure after focusing through a taking lens. The exposed instant photo film is advanced from the photo film pack, and advanced from the photo film pack, and squeezed between two spreader rollers. A processing solution pod is disposed along on one edge of the instant photo film, and when squeezed by the spreader rollers, leaves processing solution to flow out and spread in the instant photo film. When a predetermined further time elapsed, the image is created in an exposure surface of the instant photo film.

The printer built-in type of electronic still camera according to the above-mentioned document includes an image sensor or CCD disposed at a focal plane of the taking lens. When the printer built-in type of electronic still camera is operated for photographing an image, the object image focused on the surface of the image sensor is converted photoelectrically, and then digitally converted into image data, which is written to a smart media (trade name) or other memory cards. A printing head is driven according to the image data read from the smart media, to provide an exposure to the instant photo film. After this, the instant photo film is advanced in driving a pair of the spreader rollers which are similar to those of the instant camera. Upon a lapse of a predetermined time, the image appears in one surface of the instant photo film.

The instant photo film has a highly larger area for exposure than that of the photo film of 135 type. The taking lens has a considerably great focal length for focusing an image to the instant photo film. It is likely that a front end of a lens barrel specifically protrudes from a front face of a camera body. There is a known type of instant camera in which the lens barrel is collapsible. However, an amount of collapsing of the lens barrel is considerably small, because of prevention of interference with a photo film pack. The camera size has not been readily reduced.

According to the above prior document, the lens barrel is moved back and collapsed when not used, so that a portion of the lens barrel comes into a moving path where the printing head moves. Although this is an idea for reducing the camera size, there is no known technique to reduce the camera size to a degree remarkably suitable for improving portability.

SUMMARY OF THE INVENTION

In view of the foregoing problems, an object of the present invention is to provide a camera with a printer in which a pack for containing recording media is used, and of which a size can be reduced even in a simplified construction.

In order to achieve the above and other objects and advantages of this invention, a camera is provided, in which a recording medium pack for containing a sheet-shaped recording medium is used. A pack loading chamber is loaded with the recording medium pack. A front opening is provided, through which the pack loading chamber is open in a forward direction. A taking lens is adapted for focusing of an image of an object to be photographed. A lens barrel accommodates the taking lens, the lens barrel is disposed to extend in the forward direction from the pack loading chamber, has a barrel rear end, and is inserted in the front opening, wherein the barrel rear end is disposed in the pack loading chamber.

Furthermore, a barrel moving mechanism moves the lens barrel between a collapsed position and a forward position in an optical axis direction, wherein the barrel rear end, when the lens barrel is in the collapsed position, is located inside the pack loading chamber, and adapted for reducing forward protrusion of the lens barrel at a time of no use, and when the lens barrel is in the forward position, is located in front of the pack loading chamber.

The recording medium pack includes a pack opening formed in a wall opposed to the recording medium. The pack loading chamber is loaded with the recording medium pack with the pack opening oriented in the forward direction, and the barrel rear end is movable into and out of the recording medium pack through the front opening and the pack opening.

A middle position is predetermined between the collapsed position and the forward position, and the lens barrel, when set in the middle position or set in front of the middle position, allows loading and unloading of the recording medium pack to the pack loading chamber.

Furthermore, a pack detector detects loading of the recording medium pack in the pack loading chamber, to generate a detection signal. A control unit controls the barrel moving mechanism, to set the lens barrel in the collapsed position when the detection signal does not exist, and to inhibit the lens barrel from being set behind the middle position when the detection signal exists.

In a preferred embodiment, when the lens barrel is in the middle position, the barrel rear end is disposed on the recording medium or immediately in front of the recording medium.

In another preferred embodiment, when the lens barrel is in the middle position, the barrel rear end is disposed on the recording medium or immediately in front of the recording medium, and located inside the pack loading chamber.

In a further preferred embodiment, when the lens barrel is in the middle position, the barrel rear end is disposed in front of the recording medium.

The camera is a printer built-in type. Furthermore, there is an image sensor for receiving light of the object from the taking lens, to output a pick-up signal. A printing head prints the image to the recording medium according to the pick-up signal.

The printing head extends in a main scan direction. Furthermore, a recording medium moving mechanism moves the recording medium in a sub scan direction with respect to the printing head, to scan the printing head.

In another preferred embodiment, the printing head extends in a main scan direction. Furthermore, a printing head moving mechanism scans the printing head in a sub scan direction with respect to the recording medium.

The printing head moves the printing head in a head moving path disposed in front of the pack loading chamber. When the lens barrel is in the middle position, the barrel rear end is located inside the head moving path.

Furthermore, a control unit inhibits the printing head from printing when the lens barrel is in the collapsed position or the middle position.

The recording medium is an instant photo film.

In still another preferred embodiment, the camera is an instant camera, the recording medium is an instant photo film. Furthermore, a shutter mechanism provides an exposure to an exposure surface of the instant photo film through the front opening.

The recording medium pack contains a stack of plural instant photo films. Furthermore, an advancing mechanism advances the instant photo film from the recording medium pack after an exposure. Spreader rollers nip and feed the instant photo film being advanced, and spread processing solution in feeding to an outside of the pack loading chamber. A control unit controls the advancing mechanism and the lens barrel, to set the lens barrel in the forward position before a start of actuating the advancing mechanism.

In another preferred embodiment, furthermore, an externally operable member being movable or rotatable is provided. When the externally operable member is moved or rotated, the barrel moving mechanism moves the lens barrel in the optical axis direction.

In another aspect of the invention, a camera of a printer built-in type is provided, in which a recording medium pack for containing a sheet-shaped recording medium is used. The camera includes a taking lens. A lens barrel accommodates the taking lens, and has a barrel rear end. An image sensor receives object light from the taking lens, to output a pick-up signal. A pack loading chamber is disposed behind the lens barrel, for being loaded with the recording medium pack. A front opening is provided, through which the pack loading chamber is open in a forward direction. A printing head is disposed to extend in a main scan direction, for printing an image to the recording medium through the front opening according to the pick-up signal. A printing head moving mechanism scans the printing head in a head moving path in a sub scan direction with respect to the recording medium. A barrel moving mechanism moves the lens barrel between a collapsed position and a forward position in an optical axis direction, wherein the lens barrel, when in the collapsed position, is located to overlap on the head moving path, and the barrel rear end, when the lens barrel is in the collapsed position, is located inside the pack loading chamber, and when the lens barrel is in the forward position, is located in front of the pack loading chamber.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
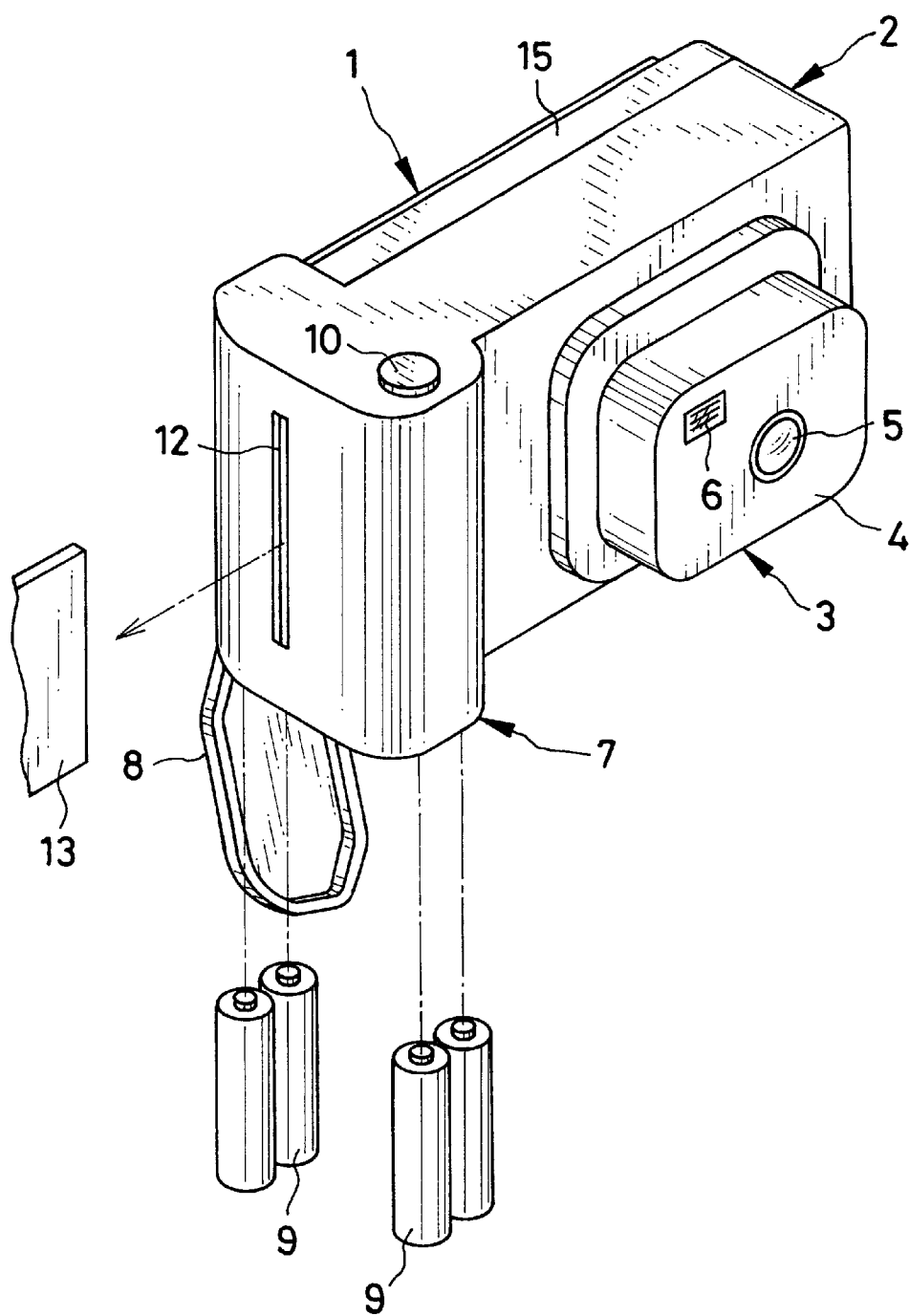
FIG. 1 is a front perspective illustrating an electronic still camera of a printer built-in type.
Figure 2:
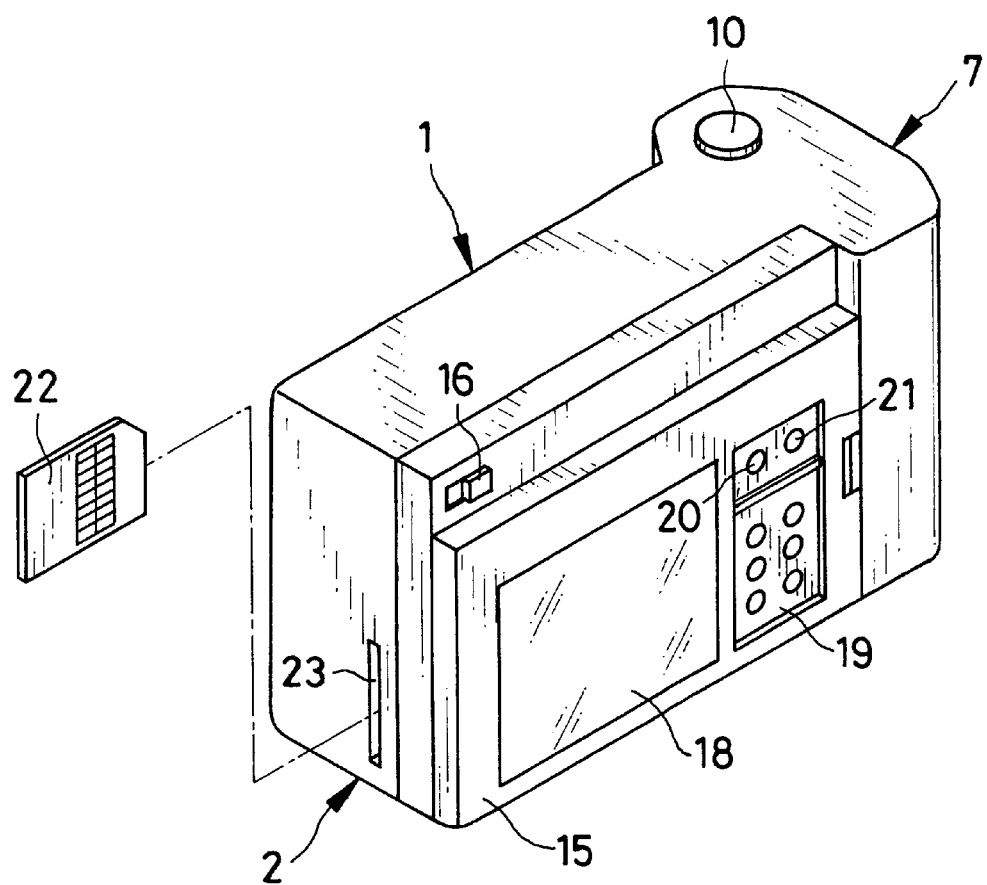
FIG. 2 is a rear perspective illustrating

In FIGS. 1 and 2, a printer built-in type of electronic still camera 1 is depicted. A camera body 2 has a camera head 3 accommodated movably back and forth in the optical axis direction. The camera head 3 includes a lens barrel 4, a taking lens 5, a flash emitter 6, a CCD or image sensor 44 (See FIG. 4), circuit elements, and the like. The taking lens 5 and the flash emitter 6 are disposed in a front portion of the lens barrel 4. CCD 44 is disposed in an inner portion of the lens barrel 4.

A grip 7 is formed with a sufficient thickness on one lateral side of the camera body 2. A battery chamber lid 8 is secured to a lower side of the grip 7. Batteries 9 as power source can be exchanged by opening the battery chamber lid 8. Examples of the batteries 9 include alkali batteries of the AA type defined by the IEC (R6 type defined by the JIS). It is possible to use a battery pack having a property of being chargeable. A release button 10 is disposed on an upper face of the grip 7. When a photographing mode is set in the electronic still camera 1, the release button 10 is depressed to photograph one frame in the manner of still photography.

An exit slot 11 is formed in a wall of the grip 7. See FIG. 3. A slot cover 12 closes the exit slot 11 in an ordinary state. When the electronic still camera 1 is set in a printer mode, a printing operation is effected. An image is recorded to an instant photo film 13 as recording medium. Then the instant photo film 13 moves and pushes open the slot cover 12 to exit from the exit slot 11.

A pair of spreader rollers 14 as recording medium moving mechanism are disposed in an inner position of the exit slot 11. See FIG. 3. The spreader rollers 14 are actuated to exit each instant photo film and to spread processing solution. If a user keeps grasping the grip 7, the instant photo film 13 cannot exit. Therefore, it is preferable to incorporate a touch sensor in the grip 7, for detecting a grasped state of the grip 7 in order to inhibit printing operation while the grip 7 is grasped.

A pack chamber lid 15 is disposed in the rear of the camera body 2 in an openable manner. A lid opener button 16 is operated to unlock the pack chamber lid 15 from the closed position, and allows the pack chamber lid 15 to open. The pack chamber lid 15, when closed, is automatically locked in the closed position. An instant photo film pack 17 as recording medium pack can be loaded and unloaded by opening the pack chamber lid 15. See FIG. 3. The instant photo film pack 17 contains approximately 10 instant photo films 13.

The pack chamber lid 15 is a component accommodating a liquid crystal display panel (LCD) 18 and an operation panel 19. The LCD panel 18 displays an image photographed by CCD 44 through the taking lens 5 in a real time manner. Also, the LCD panel 18 displays an image read from a memory. A powering button 20 and a printing button 21 are disposed in the operation panel 19 as well as various keys used for setting modes and the like. A card slot 23 is formed in a lateral wall of the camera body 2. A memory card 22 is partially inserted in the card slot 23. The memory card 22 stores image data.

Figure 3:
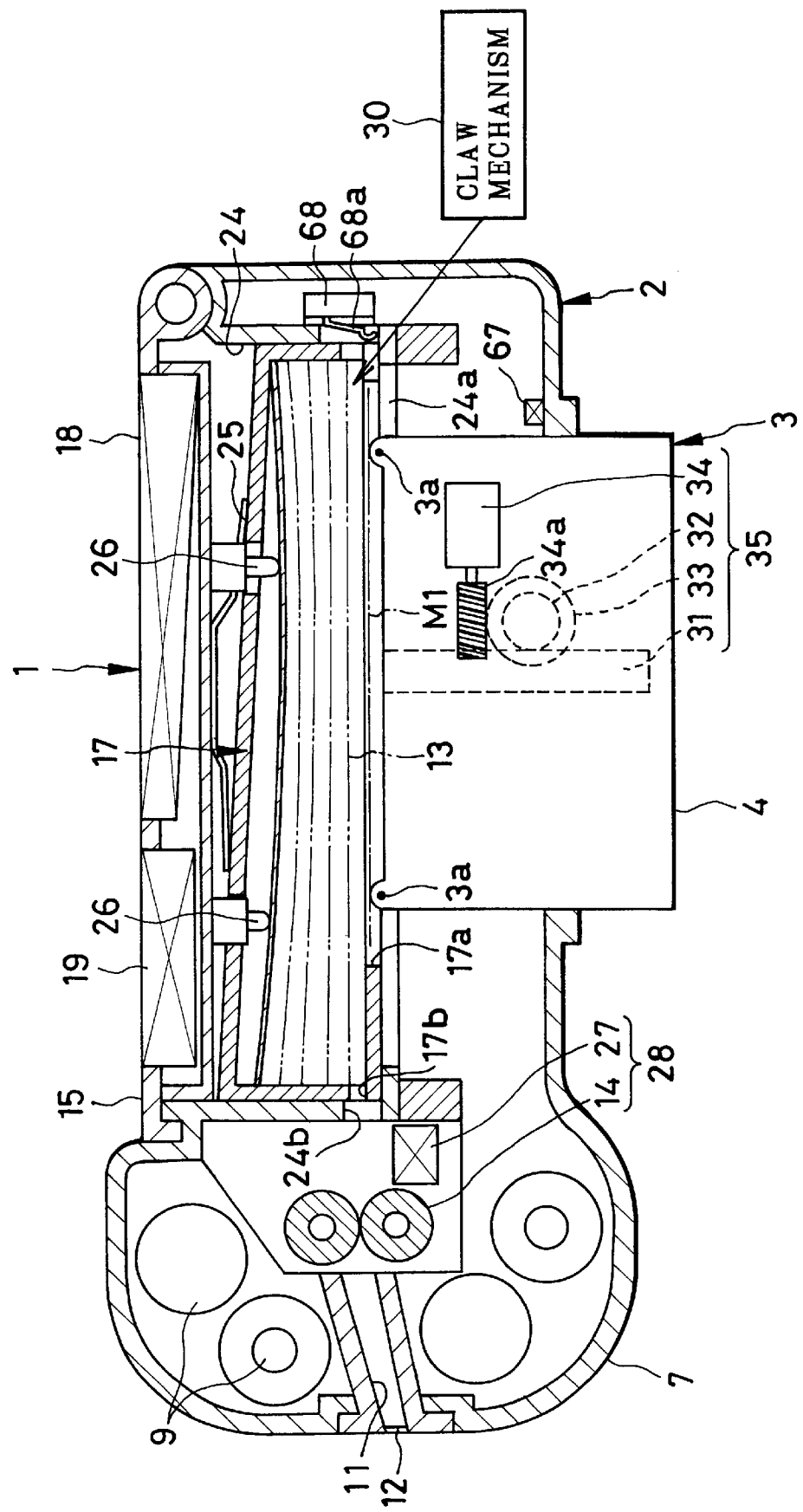
FIG. 3 is a horizontal section illustrating the electronic still camera of which a lens barrel is in a middle position.

In FIG. 3, the electronic still camera 1 with the instant photo film pack 17 is depicted. A pack loading chamber 24 is loaded with the instant photo film pack 17 before the pack chamber lid 15 is closed. A plate spring 25 inside the pack chamber lid 15 pushes the rear of the instant photo film pack 17 to position the instant photo film pack 17 in the pack loading chamber 24. A pack detector 68 detects existence of the instant photo film pack 17. Note that a movable segment 68a of the pack detector 68 is biased in a direction toward the inside of the pack loading chamber 24. When the instant photo film pack 17 is inserted in the pack loading chamber 24, the movable segment 68a is pushed and rotated by the wall of the instant photo film pack 17. The pack detector 68 detects the instant photo film pack 17.

A pack opening 17a or exposure opening is formed in the instant photo film pack 17. A slot 17b is formed in the instant photo film pack 17 for exiting the instant photo film 13 from the instant photo film pack 17. A cutout (not shown) is formed in a wall of the instant photo film pack 17 for receiving insertion of a claw of a claw mechanism 30 adapted for advancing the instant photo film 13 through the slot 17b to the outside of the instant photo film pack 17.

An optical printer 28 includes the spreader rollers 14, the printing head 27, the claw mechanism 30 and the like. An inner wall constituting the pack loading chamber 24 has a front opening 24a or printing opening and a slot 24b. The front opening 24a is opposed to the pack opening 17a of the instant photo film pack 17. The slot 24b is adapted for passage of the instant photo film 13 toward the spreader rollers 14 when the instant photo film 13 is pushed by the claw mechanism 30 and passes the slot 17b of the instant photo film pack 17. Also, two pushing pads 26 are disposed inside the pack chamber lid 15, and press the instant photo film 13 toward the pack opening 17a.

A printing head 27 has a long shape extending in a main scan direction that is vertical to the sheet surface of the drawing, and is secured fixedly inside a feeding path from the slot 24b of the pack loading chamber 24 to the spreader rollers 14. The printing head 27 includes three arrays of LEDs of a small shape for coloring red, green and blue colors. Light from the LED arrays passes lens arrays of minute lenses disposed in front of the LED arrays, and is applied commonly to each of lines on the instant photo film 13. Therefore, the instant photo film 13 is exposed line by line for three colors simultaneously.

A rack 31 is fixed on a lower wall of the lens barrel 4. A gear 32 in the camera body 2 is meshed with the rack 31. A worm wheel 33 is formed with the gear 32. A worm 34a is secured to an output shaft of a lens barrel motor 34, and meshed with the worm wheel 33. Those elements constitute a barrel moving mechanism 35 for moving the lens barrel 4 in the optical axis direction.

While the camera body 2 is loaded with the instant photo film pack 17, a barrel rear end 3a of the lens barrel 4 comes in the pack opening 17a of the instant photo film pack 17, and movable to a middle position M1 that is defined nearly at an exposure surface of the instant photo film 13. When the camera body 2 is not loaded with the instant photo film pack 17, the barrel rear end 3a of the lens barrel 4 is movable to a collapsed position that is defined closely in front of the pushing pads 26. See FIG. 5. When the electronic still camera 1 is not used, the lens barrel 4 in the collapsed position can have a reduced amount of protrusion from a front face of the camera body 2. This is advantage in good portability.

Figure 4:
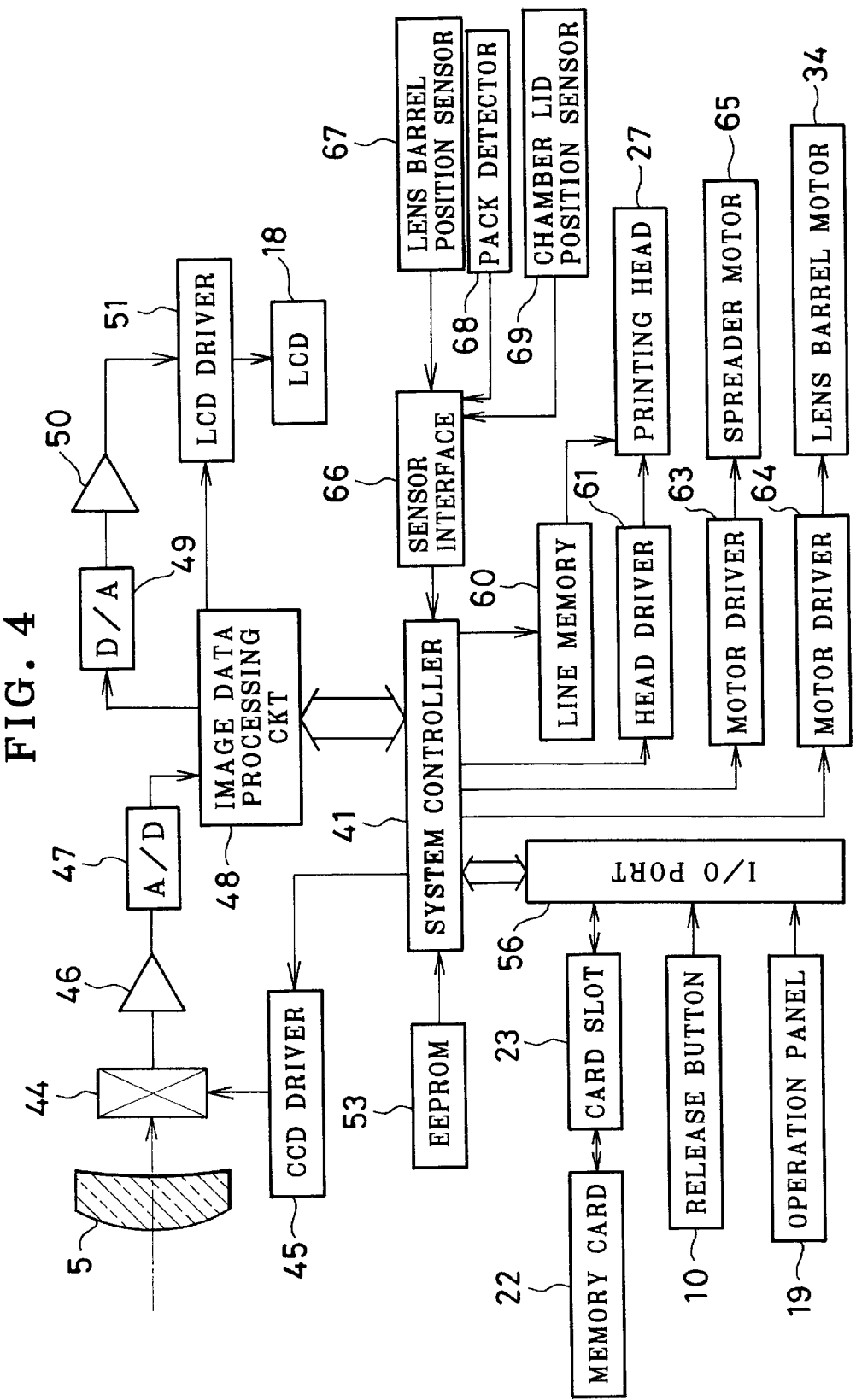
FIG. 4 is a block diagram illustrating circuit arrangement of the electronic still camera.

In FIG. 4, a system controller 41 as control unit controls general electric operation of the electronic still camera 1. CCD 44 is disposed behind the taking lens 5. When the taking lens 5 is in-focus, an image of a photographic object is focused on to a photoelectric surface of CCD 44. A CCD driver 45 drives CCD 44. CCD 44 outputs a pick-up signal by photoelectric conversion of the received light of the photographic object.

Micro color filters of red, green and blue colors in a minute size are arranged on a photoelectric surface of CCD 44 in a matrix form. An amplifier 46 suitably amplifies a pick-up signal output by CCD 44 in a serial form. Then an A/D converter 47 converts the amplified pick-up signal into a digital form. As is well-known in the art, driving of the CCD driver 45 is synchronized with the sampling of the A/D converter 47.

The A/D converter 47 converts the pick-up signal of the analog form into image data of a digital form, which is sequentially sent to an image data processing circuit 48. The image data processing circuit 48 subjects the image data to signal processing, for example, matrix operation, white balance adjustment, and gamma correction. The image data processing circuit 48 also produces a video signal associated with a composite signal of the NTSC system on the basis of the image data after being processed. The video signal is sent to a D/A converter 49, an amplifier 50 and then to an LCD driver 51. The LCD panel 18 continuously displays the object image. In short, the LCD panel 18 operates as an electronic viewfinder when in the photographing mode. The LCD panel 18, when in the printer mode, displays a still image after being photographed according to the image data read from the memory card 22.

EEPROM 53 is accessed by the system controller 41 for writing and reading data. EEPROM 53 stores sequence programs of plural types, correction data, control data and other data. An I/O port 56 is connected with the system controller 41, which monitors signals from the release button 10, the operation panel 19 and the like via the I/O port 56, for signal processing according to signals as input. Also, the system controller 41 writes data to, and reads data from, the memory card 22 through the card slot 23. The memory card 22 stores image data obtained from the image data processing circuit 48 per each frame, and has storage capacity enough for storing image data of 50 frames.

In the printer mode, the system controller 41 reads image data from the memory card 22 one line after another. A line memory 60 receives transfer of the image data of lines. A head driver 61 is driven by the system controller 41. The head driver 61 causes the printing head 27 to take an exposure simultaneously for the three colors of red, green and blue colors in each of the lines on the instant photo film 13.

Motor drivers 63 and 64 are connected with the system controller 41, which cause them to control a spreader motor 65 and the lens barrel motor 34. The spreader motor 65 rotates the spreader rollers 14. A sensor interface 66 is connected with the system controller 41. Through the sensor interface 66, the system controller 41 monitors outputs of a lens barrel position sensor 67, the pack detector 68 and a chamber lid position sensor 69. The lens barrel position sensor 67 is disposed near to the lens barrel 4, and detects a position of the lens barrel 4. The pack detector 68 is disposed on a lateral side of the pack loading chamber 24, and detects loading of the instant photo film pack 17. The chamber lid position sensor 69 detects an open or closed state of the pack chamber lid 15. The lens barrel position sensor 67 is an optical device, receives light reflected by the outer wall of the camera head 3, and detects the middle position M1 and the collapsed position of the camera head 3.

Figure 5:
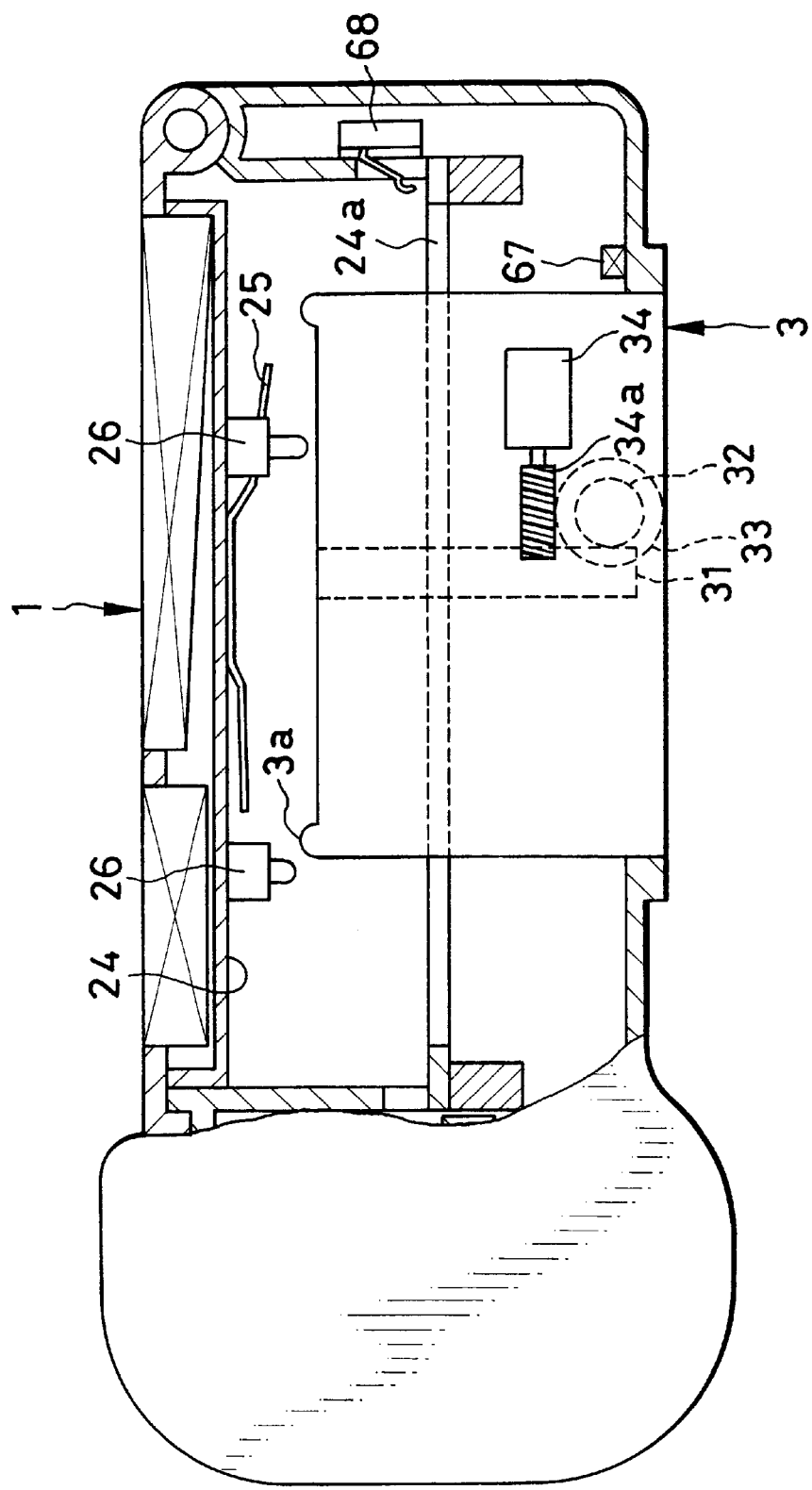
FIG. 5 is an explanatory view in horizontal section, illustrating the electronic still camera of which the lens barrel is in a collapsed position.
Figure 6:
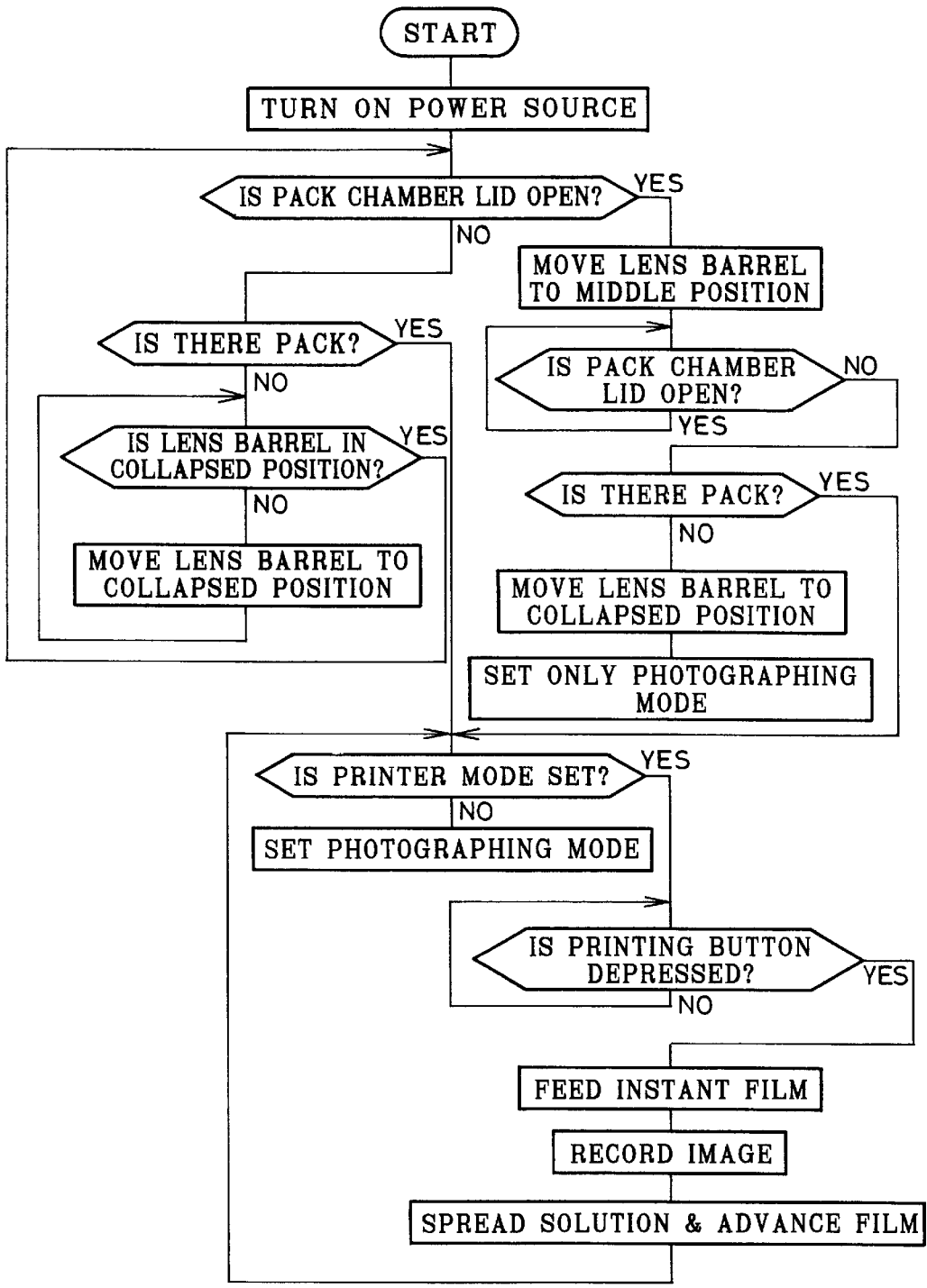
FIG. 6 is a flow chart illustrating operation of the electronic still camera.

The operation of the electronic still camera 1 is now described with reference to FIGS. 5 and 6. When the powering button 20 is turned on, the system controller 41 and other elements are powered. Initially, the photographing mode is set. The system controller 41 checks outputs from the lens barrel position sensor 67, the pack detector 68 and the chamber lid position sensor 69 to recognize the position of the lens barrel 4, the existence or absence of the instant photo film pack 17 and the open or closed state of the pack chamber lid 15.

The system controller 41 moves the lens barrel 4 according to results of monitor at the respective sensors. When the pack chamber lid 15 is open, the system controller 41 drives the barrel moving mechanism 35 to move the camera head 3 toward the middle position M1. When the camera head 3 comes to the middle position M1 directly short of a position of contacting the instant photo film 13, the system controller 41 stops the barrel moving mechanism 35. As illustrated in FIG. 3, the electronic still camera 1 is ready for being loaded with the instant photo film pack 17, as the barrel rear end 3a of the lens barrel 4 does not contact the instant photo film 13.

When the system controller 41 recognizes that the pack chamber lid 15 has become closed, the system controller 41 monitors existence and absence of the instant photo film pack 17. If the instant photo film pack 17 does not exist, then the system controller 41 causes the barrel moving mechanism 35 to move the lens barrel 4 toward the collapsed position. When the camera head 3 comes to the collapsed position, the system controller 41 stops the barrel moving mechanism 35. In FIG. 5, the barrel rear end 3a of the lens barrel 4 comes to a position inside the pack loading chamber 24. A front face of the camera head 3 comes flush with a front face of the camera body 2, to minimize the contour size of the electronic still camera 1. When the pack chamber lid 15 is closed, the camera head 3 is moved to the middle position M1 if the instant photo film pack 17 exists in the electronic still camera 1.

When in the photographing mode, CCD 44 photographs an object continuously. An image is obtained, and displayed in the LCD panel 18 which operates as an electronic viewfinder. When the release button 10 is released with the object framed, image data of the image in the LCD panel 18 is written to the memory card 22. The release button 10 is released again for more exposures. Image data of at most 50 frames are written to the memory card 22.

While the instant photo film pack 17 exists in the electronic still camera 1, the operation panel 19 is operated to set the printer mode instead of the photographing mode. The system controller 41 detects a position of the lens barrel 4 to move the same to the middle position. The system controller 41 reads the image data from the memory card 22, and causes the D/A converter 49 to display stored image frames in the LCD panel 18. Furthermore, the operation panel 19 is operated to designating one of the displayed image frames.

After a frame is designated, the printing button 21 is depressed to start printing the frame displayed in the LCD panel 18. The claw mechanism 30 advances one of the instant photo films 13 disposed in the foremost position toward the spreader rollers 14. When an exposed region of the instant photo film 13 comes to a position of the printing head 27, image data is read from the memory card 22 one line after another, and transferred to the line memory 60. The printing head 27 is driven by the head driver 61. The printing head 27 effects exposure of each one line in the instant photo film 13 for the three colors of red, green and blue simultaneously.

The instant photo film 13 is advanced by the claw mechanism 30 stepwise as much as a width of each one line, for recording one line after another for the three colors simultaneously. When the advancing edge of the instant photo film 13 is nipped by the spreader rollers 14, the spreader rollers 14 advance the instant photo film 13 stepwise by the line width in the equal manner. The printing head 27 continues full-color printing one line after another.

Shortly after the advancing end of the instant photo film 13 becomes nipped by the spreader rollers 14, a processing solution pod of the instant photo film 13 is pushed open by the same to spread the processing solution to the instant photo film 13. Before spreading of the processing solution, the printing head 27 has started operating for effecting an exposure. The instant photo film 13, after being exposed, is exited through the exit slot 11 in pushing open the slot cover 12. At a lapse of a predetermined time, an image appears in an exposure surface of the instant photo film 13.

If the pack chamber lid 15 remains open, printing is not started even when the printing button 21 is depressed. Also, if the instant photo film pack 17 is not loaded, printing is not started even upon depressing the printing button 21.

The lens barrel 4 in the electronic still camera 1 is set in the middle position M1 or collapsed position, so the electronic still camera 1 can be compact in a manner advantageous in good portability. The printing head 27 is stationary between the spreader rollers 14 and the slot 24b of the pack loading chamber 24. So the barrel rear end 3a of the lens barrel 4 can be entered in the instant photo film pack 17 partially in manner consistent to compactness.

In the above embodiment, the barrel rear end 3a of the lens barrel 4 in the middle position M1 is located inside the instant photo film pack 17 but does not contact the instant photo film 13. It is, however, possible that the middle position M1 is predetermined so that the barrel rear end 3a contacts the instant photo film 13 lightly, or contacts the instant photo film 13 with pressure for a small shift into the instant photo film pack 17. Of course, the instant photo film 13 in the instant photo film pack 17 must be kept movable for printing while the barrel rear end 3a is in the middle position M1.

In the above embodiment, the lens barrel 4 is movable between the middle position M1 and the collapsed position.

However, the camera head 3 may be stationary and fixed in the middle position M1. In this construction, it is possible that the camera does not include the barrel moving mechanism 35, the lens barrel position sensor 67, the pack detector 68 or the chamber lid position sensor 69. The size of the camera can be reduced, to reduce a manufacturing cost.

In the above embodiment, the printing head is stationary. However, the instant photo film 13 may be stationary in the course of printing, and the printing head can be moved for printing. A preferred embodiment with this feature is described hereinafter with reference to FIGS. 7–10. Elements similar to those of the above embodiment are designated with the identical reference numerals.

Figure 7:
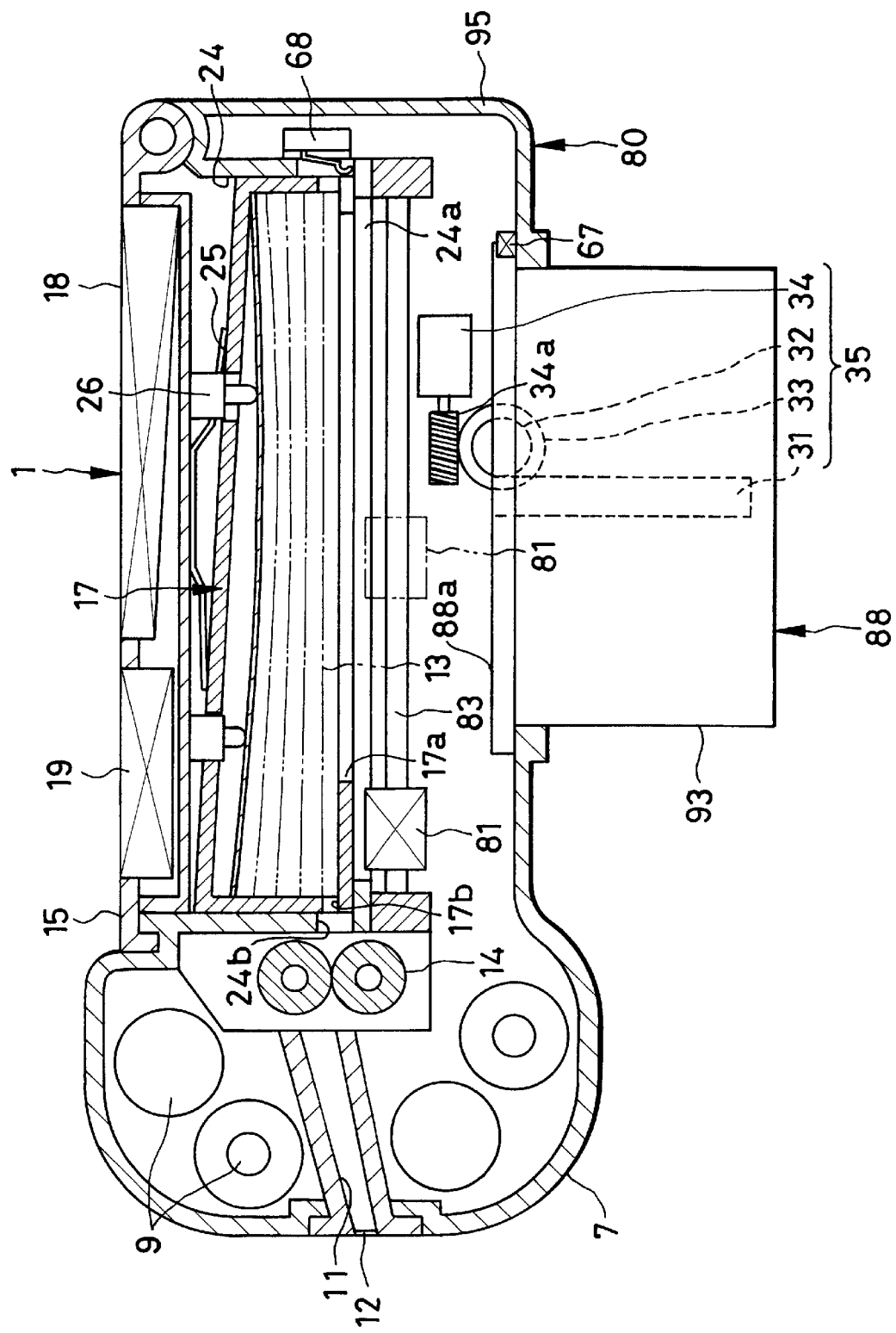
FIG. 7 is a horizontal section illustrating the electronic still camera of which the lens barrel is in a forward position.

In FIG. 7, a printing head 81 of an electronic still camera 80 has a long shape extending in a direction that is vertical of the drawing sheet, and is movable in a direction of feeding the instant photo film 13 directly in front of the front opening 24a of the pack loading chamber 24. The printing head 81 includes a fluorescent lamp tube, three belt-shaped color filters, and at least one array of LCD segments. The fluorescent lamp tube is long in the direction vertical to the drawing sheet. The belt-shaped color filters are selectively insertable into a path of white light emitted in a slit shape by the fluorescent lamp tube, and are of three kinds of transparent red, green and blue colors. The LCD segment array has the segments having transmission density controllable per each pixel.

Figure 8:
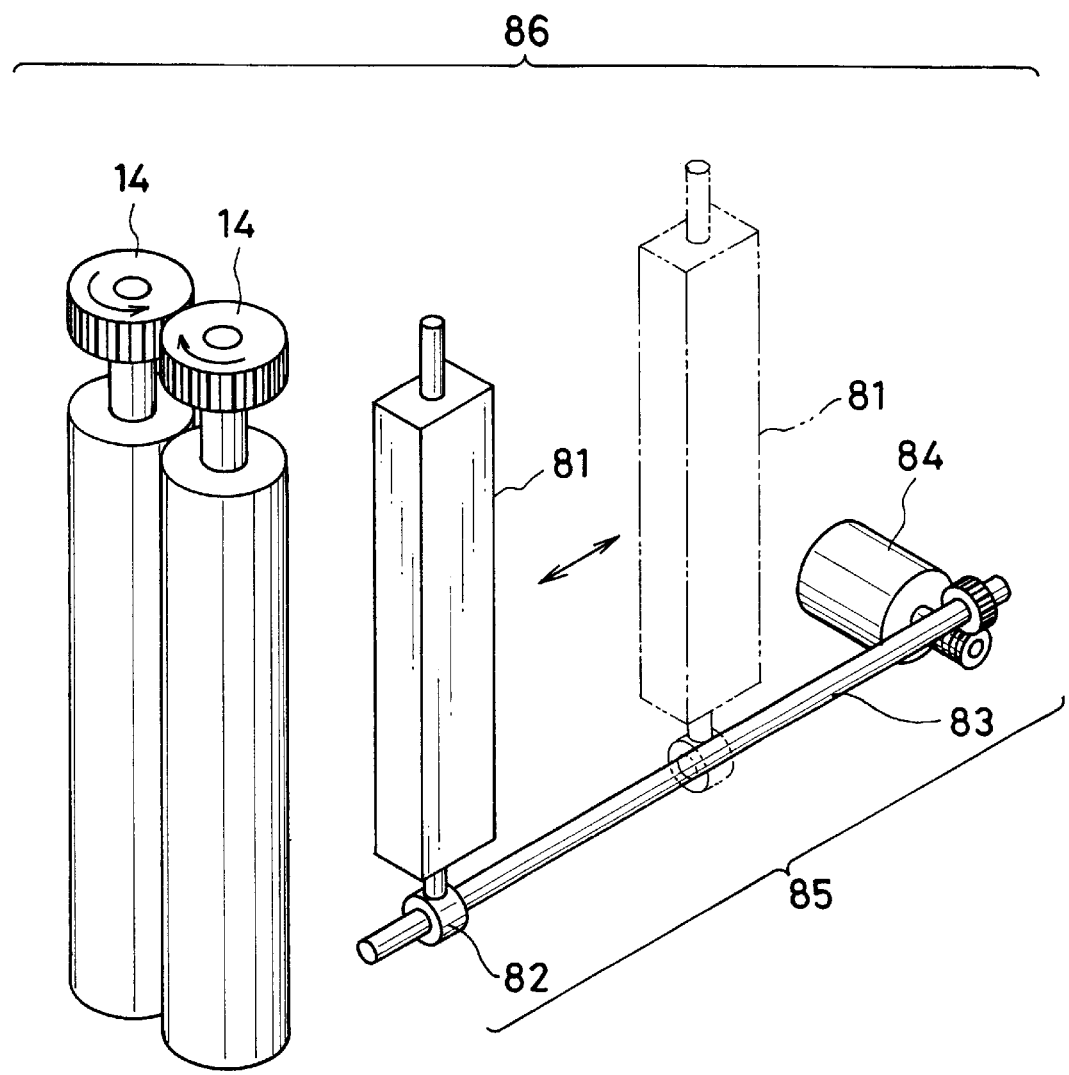
FIG. 8 is a perspective illustrating an optical printer incorporated in the electronic still camera.

In FIG. 8, a printing head moving mechanism 85 is constituted by a nut 82, a lead screw 83 and a scanning motor 84. The nut 82 is fixed on one end of the printing head 81. The lead screw 83 is helically coupled with the nut 82. When the scanning motor 84 is driven, the lead screw 83 is rotated. The printing head 81 is moved in parallel with the axis of the lead screw 83.

For example, the belt-shaped color filter of the red color with transmittance is kept inserted in the printing light path. In synchronism with movement of the printing head 81, LCD segments in the LCD segment arrays are controlled for changes in transmittance density, so that red color for one imaging frame can be printed. When the printing head 81 is moved across the front opening 24a for one time in either of the two directions, one of the three belt-shaped color filters of the three colors is used. The LCD segments are driven. So a full-color image can be printed to the instant photo film 13 in a three-color frame-sequential recording. In short, an optical printer 86 is constituted by the printing head 81 and the printing head moving mechanism 85.

In the course of printing, the printing head 81 is moved in a range of the front opening 24a as indicated by the phantom line. Except for the printing time, the printing head 81 lies in a ready position that is away from the pack opening 17a of the instant photo film pack 17. The ready position of the printing head 81 is outside a moving path of a camera head 88. At the time of not printing, it is possible to move back the camera head 88 to a position overlapping the moving path of the printing head 81. A barrel rear end 88a of a lens barrel 93 has a limited shape and position that can be covered in a contour of the front opening 24a of the pack loading chamber 24. When the instant photo film pack 17 does not exist, the lens barrel 93 can be moved back fully to enter the barrel rear end 88a partially in the pack loading chamber 24.

Figure 9:
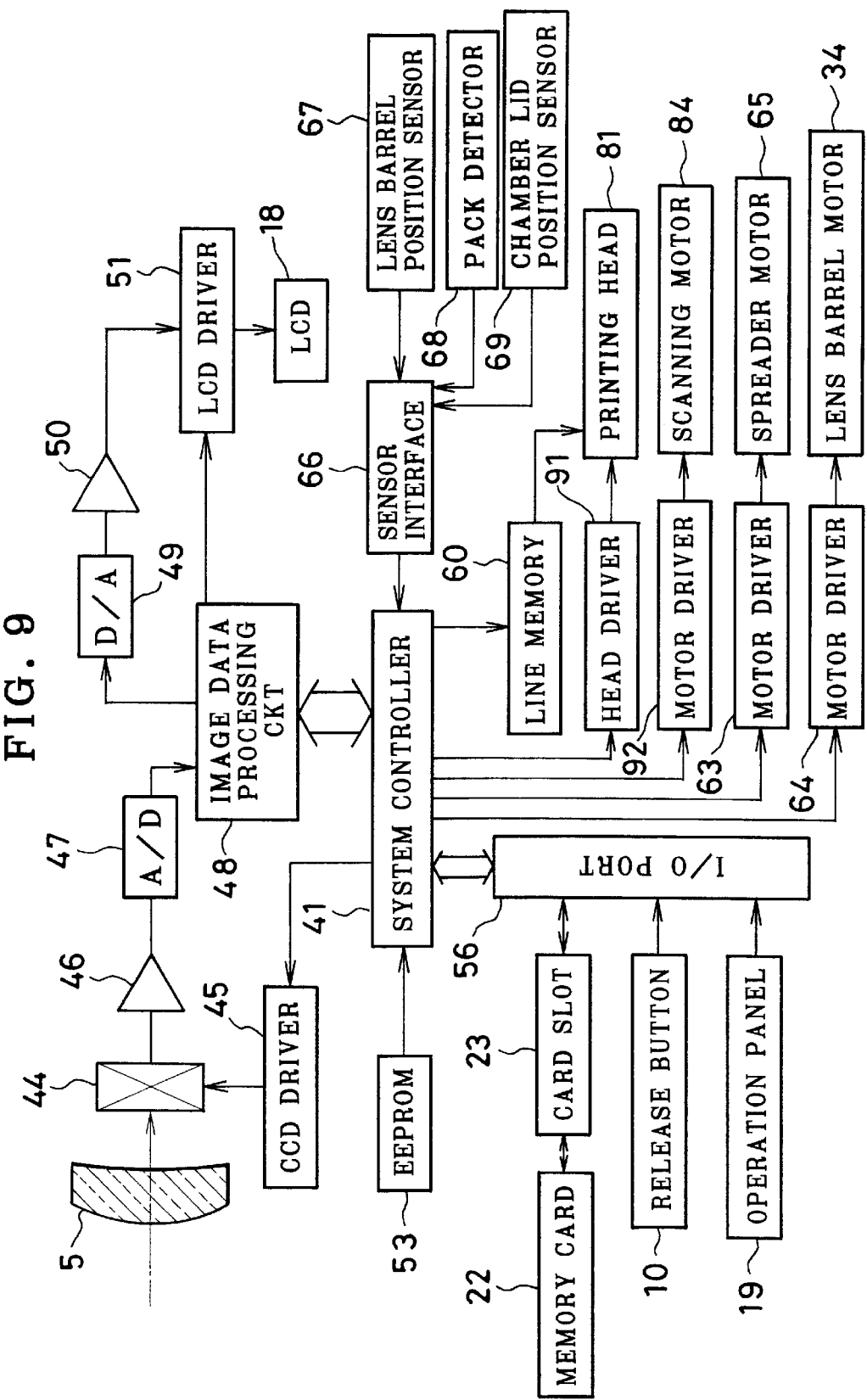
FIG. 9 is a block diagram illustrating circuit arrangement of the electronic still camera.

In FIG. 9, the system controller 41 causes a head driver 91 and a motor driver 92 to control respectively the printing head 81 and the scanning motor 84. The lens barrel position sensor 67 receives light reflected by the outside of the lens barrel 93, and detects the forward position, a middle position M2 and the collapsed position. The middle position M2 is so defined that the barrel rear end 88a of the lens barrel 93, when in the middle position M2, is located inside a moving path of the printing head 81 and also outside the pack loading chamber 24. The middle position M2 is different from the middle position M1 according to the above embodiment, because the barrel rear end of the camera head, when in the middle position M1, contacts the instant photo film 13 in the pack loading chamber 24 or is slightly short of a position of contacting the instant photo film 13. In other words, the middle position M2 is defined in front of the middle position M1, and farther from the collapsed position.

In operation of the electronic still camera 80, at first the powering button 20 is turned on, to power the system controller 41 and other elements. The system controller 41 checks outputs from the lens barrel position sensor 67, the pack detector 68 and the chamber lid position sensor 69 to recognize the position of the lens barrel 93, the existence or absence of the instant photo film pack 17 and the open or closed state of the pack chamber lid 15.

Then the system controller 41 drives the barrel moving mechanism 35, to move the lens barrel 93 in the forward direction. When the camera head 88 comes to the forward position, the system controller 41 stops the barrel moving mechanism 35. As illustrated in FIG. 7, the camera head 88 is set in front of the moving path of the printing head 81. If the camera head 88 is initially set in the forward position, the barrel moving mechanism 35 does not operate and leaves the camera head 88 to stand in the forward position. Also, the camera is set in the photographing mode.

Figure 10A:
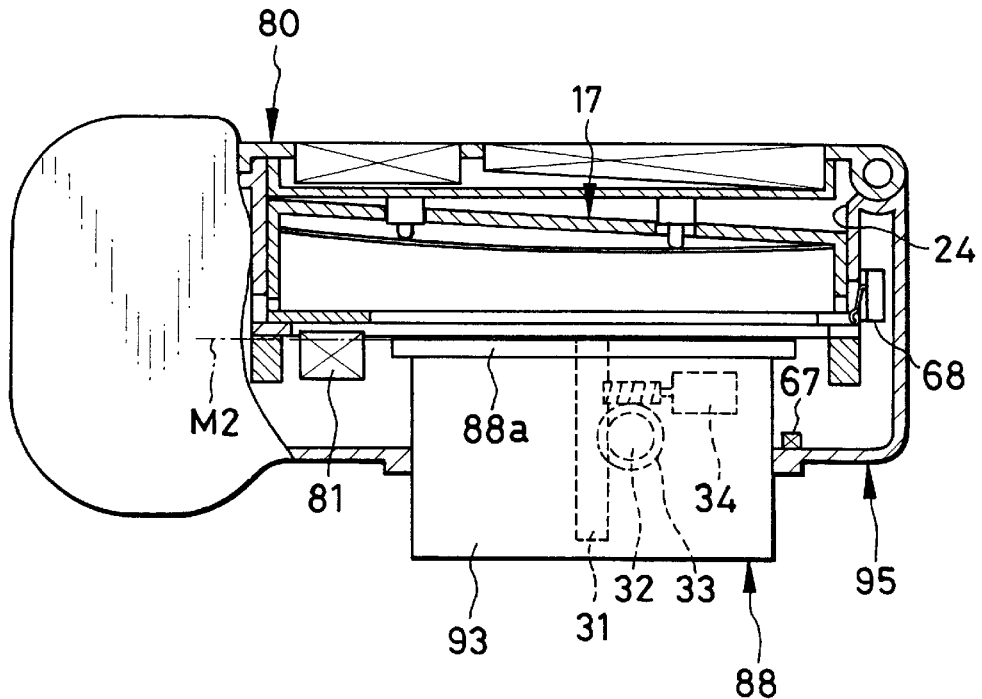
FIG. 10A is an explanatory view in horizontal section, illustrating the electronic still camera of which a lens barrel is in a middle position.

The system controller 41 monitors outputs of the sensors and detectors, and moves the lens barrel 93 according the monitor results. When the pack chamber lid 15 is open, the system controller 41 drives the barrel moving mechanism 35 to move the camera head 88 toward the middle position M2. When the camera head 88 comes to the middle position M2, the system controller 41 stops driving the barrel moving mechanism 35. As depicted in FIG. 10A, the camera head 88 is set in the moving path of the printing head 81.

Figure 10B:
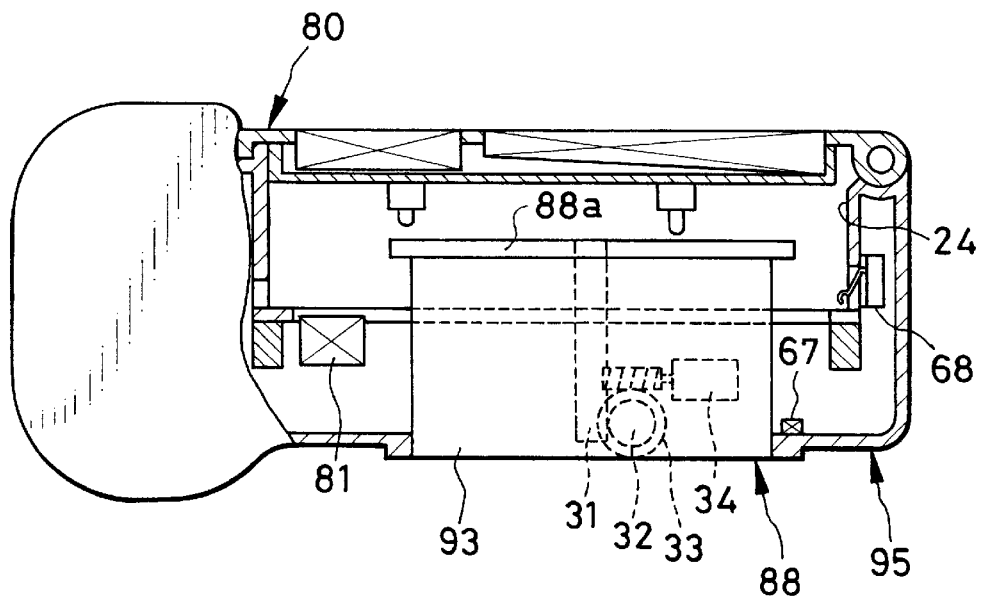
FIG. 10B is an explanatory view in horizontal section, illustrating the instant camera of which the lens barrel is in a collapsed position.

When the system controller 41 recognizes that the pack chamber lid 15 has become closed, the system controller 41 monitors existence and absence of the instant photo film pack 17. If the instant photo film pack 17 does not exist, the lens barrel 93 is moved to the collapsed position. The system controller 41 drives the barrel moving mechanism 35, to move the camera head 88 in the backward direction toward the collapsed position. When the camera head 88 comes to the collapsed position, the system controller 41 stops the barrel moving mechanism 35. In FIG. 10B, the camera head 88 comes to a position behind the moving path of the printing head 81, and enters the pack loading chamber 24. A front face of the camera head 88 comes flush with a front face of a camera body 95, to minimize the contour size of the electronic still camera 80. When the pack chamber lid 15 is closed, the camera head 88 is set to the middle position M2 if the instant photo film pack 17 exists in the electronic still camera 80.

If the instant photo film pack 17 exists and if in the printer mode, then the system controller 41 drives the barrel moving mechanism 35 to move the lens barrel 93 to the forward position. After this movement, the printing button 21 is depressed. The printing head 81 is moved for scanning, and records red, green and blue colors by exposures to the instant photo film 13 in the three-color frame-sequential recording.

The instant photo film 13 after being exposed is pushed by the claw mechanism 30 toward the spreader rollers 14.

When the advancing edge of the instant photo film 13 becomes nipped by the spreader rollers 14, the processing solution pod is squeezed or pressurized. Processing solution is spread to exit the instant photo film 13 through the exit slot 11. At the lapse of a predetermined time, an image appears in the exposure surface of the instant photo film 13.

Figure 11:
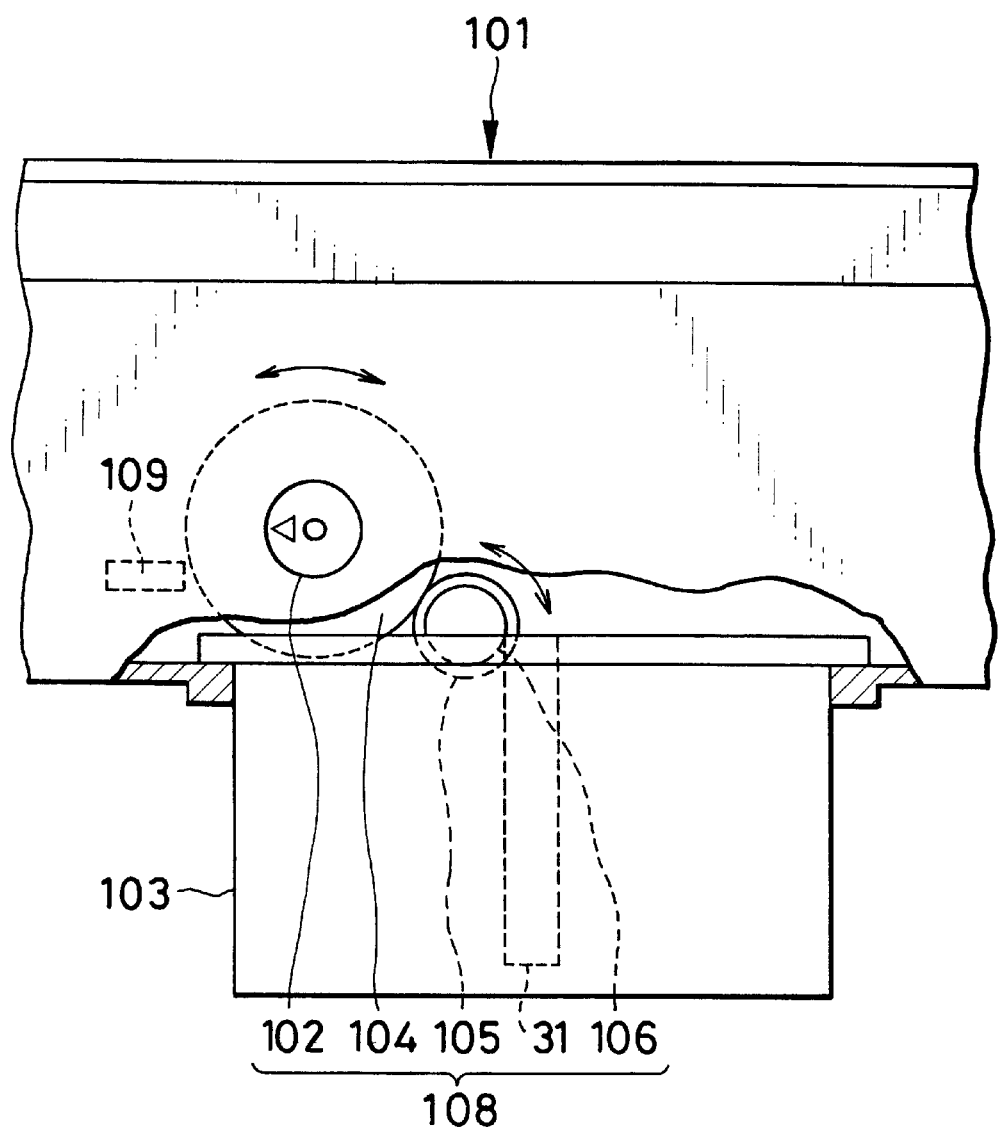
FIG. 11 is a plan, partially cutaway and broken, illustrating another preferred camera having a lens barrel moving dial.

In the two first embodiments, the camera head is moved by rotation of a motor. In contrast, another preferred electronic still camera 101 of FIG. 11 has a camera head or lens barrel 103 moved manually by operating a lens barrel moving dial 102 as external operation member.

A barrel moving mechanism 108 includes the lens barrel moving dial 102, gears 104 and 105, a worm wheel 106 and the rack 31. The gear 104 rotates coaxially with the lens barrel moving dial 102. The gear 105 is meshed with the gear 104. The worm wheel 106 rotates coaxially with the gear 105. The rack 31 is fixed on a lower wall of the lens barrel 93. The rack 31 is meshed with the worm wheel 106. When the lens barrel moving dial 102 rotates, the gear 104 also rotates coaxially. The gear 105 is rotated by the mesh with the gear 104. The worm wheel 106 rotates with the gear 105, to move the camera head or lens barrel 103 back and forth in cooperation with the rack 31.

The barrel moving mechanism 108 is controlled by the system controller 41. When the instant photo film pack 17 exists in the pack loading chamber 24, a stopper 109 limits a range where the lens barrel moving dial 102 is rotatable so as to prevent the camera head or lens barrel 103 from moving behind the middle position. Therefore, the camera head or lens barrel 103 does not come partially in the pack loading chamber 24 in the course of loading the instant photo film pack 17. The instant photo film pack 17 is prevented from being damaged.

During the printing operation, the lens barrel moving dial 102 is locked and kept immovable. The camera head or lens barrel 103 is locked in the forward position. Upon completion of the printing, the lens barrel moving dial 102 is unlocked. When the printing button 21 is depressed, printing is started if the camera head or lens barrel 103 is in the forward position. However, printing is not started if it is not.

Figure 12:
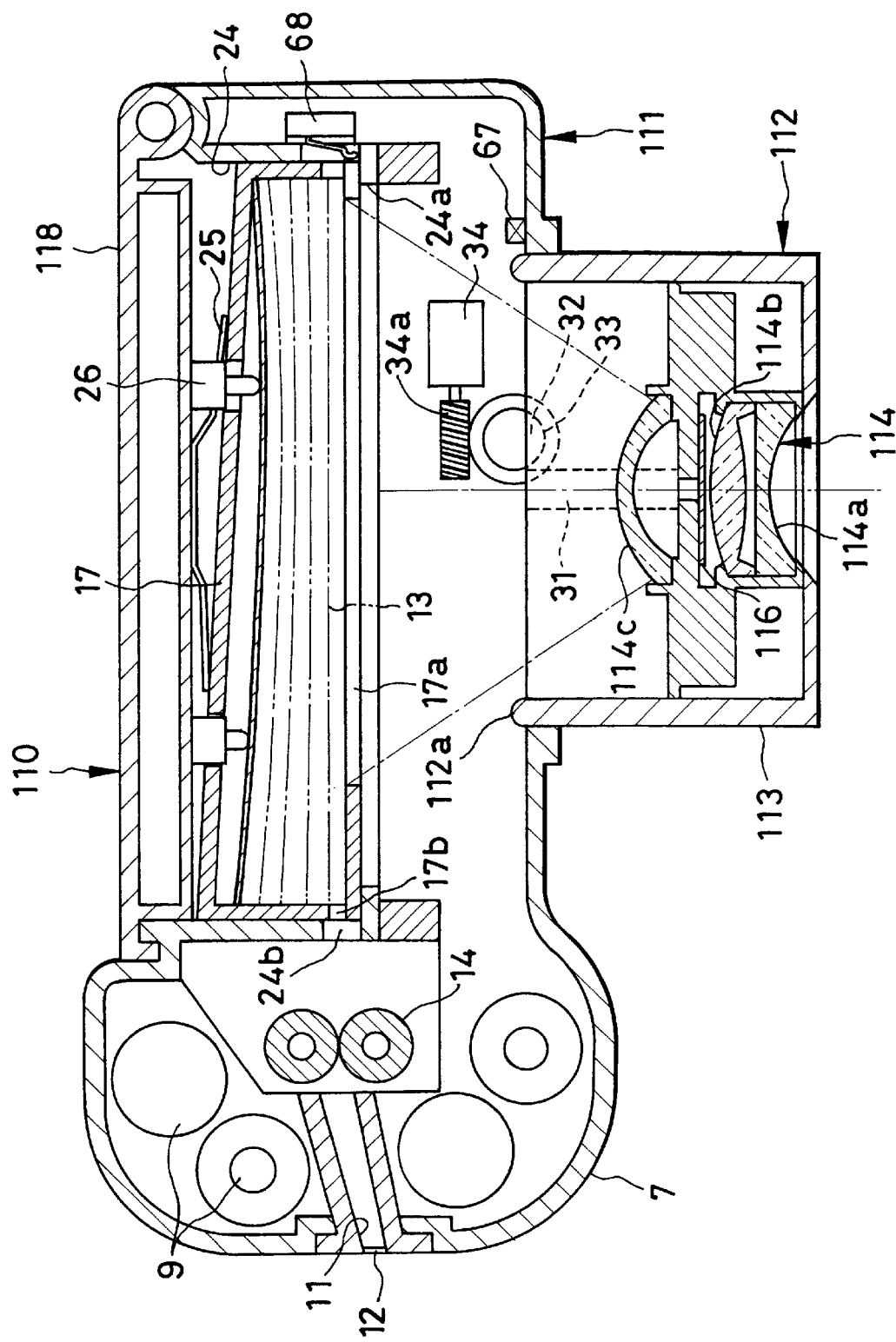
FIG. 12 is a horizontal section illustrating an instant camera according to the invention.

An additional preferred embodiment is described now. In FIG. 12, an instant camera 110 is illustrated, in which there are a camera body 111 and a camera head 112 movable in the camera body 111 in the optical axis direction.

Figure 13:
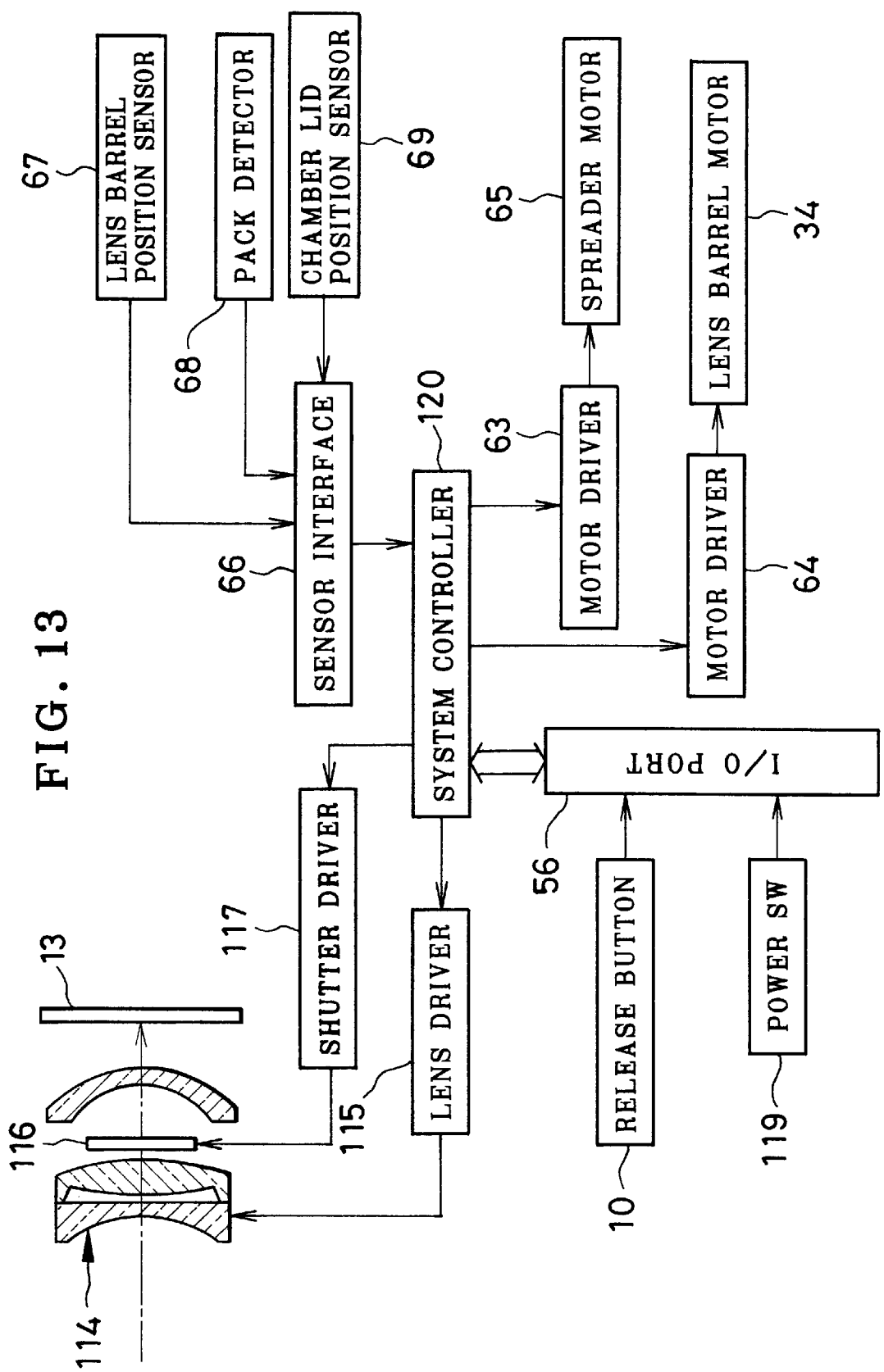
FIG. 13 is a block diagram illustrating circuit arrangement of the instant camera.

The camera head 112 is constituted by a lens barrel 113, a taking lens 114, a lens driver 115 (See FIG. 13), a shutter mechanism 116 and a shutter driver 117 (See FIG. 13). The taking lens 114 includes three lens groups 114a, 114b and 114c incorporated in the lens barrel 113. The lens driver 115 moves the lens groups 114a–114c in the optical axis direction for focusing. The shutter mechanism 116 is disposed between the lens groups 114b and 114c. The shutter driver 117 drives the shutter mechanism 116 for opening and closing. The rack 31 is fixed on a lower wall of the camera head 112 in a manner similar to the above embodiment, and drives the lens barrel motor 34 to move the lens barrel 113 in the optical axis direction.

A pack chamber lid 118 is disposed in the rear of the camera body 111. The instant photo film pack 17 is inserted in the pack loading chamber 24 when the pack chamber lid 118 is open. When the instant photo film pack 17 exists in the pack loading chamber 24, a barrel rear end 112a can be set in a middle position M3 which is nearly on a front side of the instant photo film pack 17. See FIG. 14A. When the instant photo film pack 17 does not exist, the lens barrel 113 can be moved to the collapsed position where the barrel rear end 112a is nearly on a front end of the pushing pads 26. See FIG. 14B.

To take an exposure, the lens barrel 113 is set in the forward position that is the foremost as viewed from the camera body 111. See FIG. 12. The taking lens 114 is moved in the optical axis direction for focusing.

In FIG. 13, circuit arrangement of the instant camera 110 is illustrated. A system controller 120 as control unit effects overall control of the instant camera 110. The system controller 120 causes the lens driver 115 to position the taking lens 114, and causes the shutter driver 117 to open and close the shutter mechanism 116.

Figure 15:
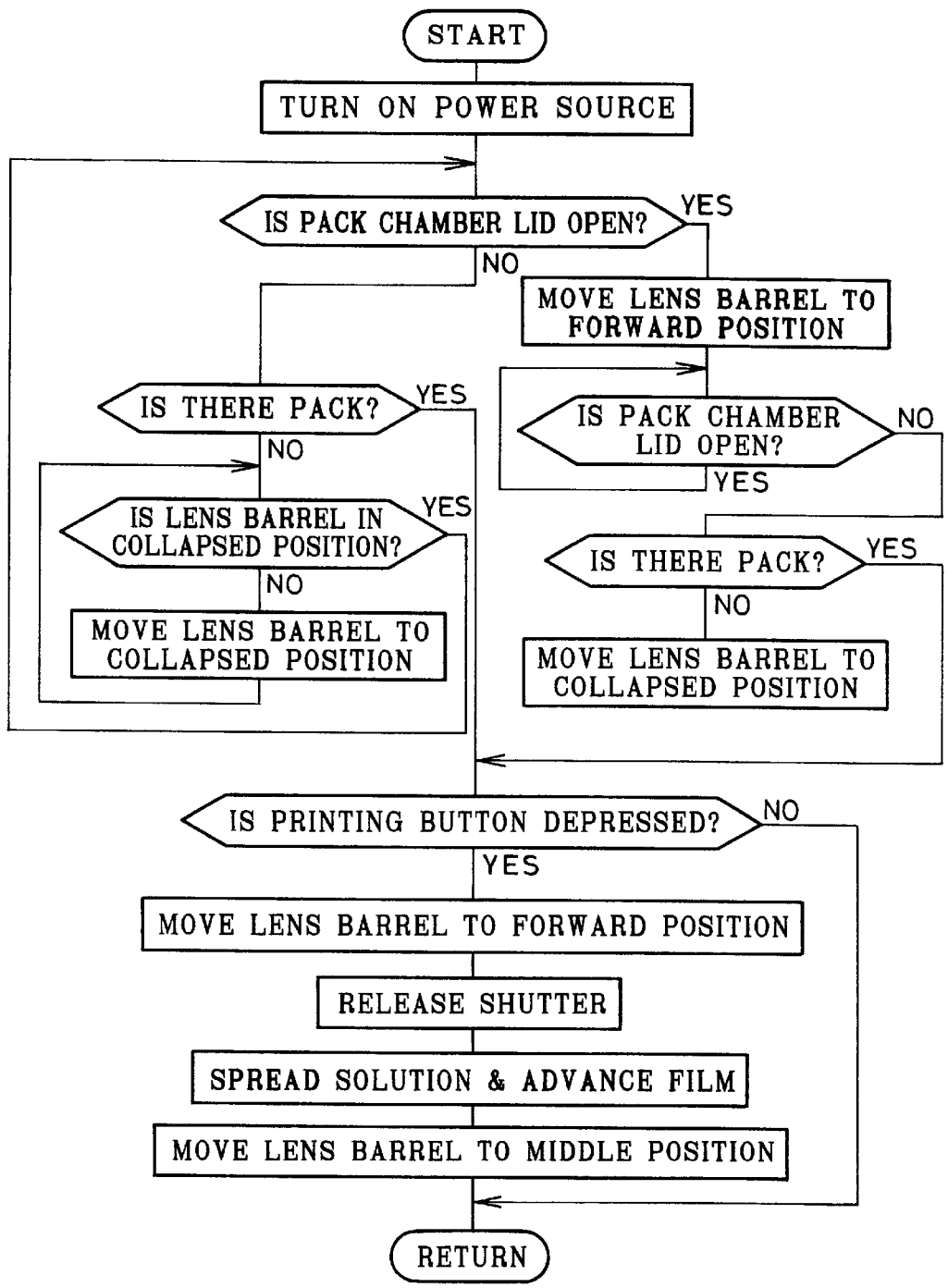
FIG. 15 is a flow chart illustrating operation of the instant camera.

The operation of the instant camera 110 is described by referring to the flow in the FIG. 15. When a power switch 119 is turned on, the system controller 120 and other circuit elements are powered. The system controller 120 initially monitors outputs of the lens barrel position sensor 67, the pack detector 68 and the chamber lid position sensor 69, and checks the position of the lens barrel 113, existence and absence of the instant photo film pack 17, and the open or closed state of the pack chamber lid 118.

The system controller 120 drives the barrel moving mechanism 35 and moves the lens barrel 113 in the forward direction. When the camera head 112 is set in the forward position, the system controller 120 stops the barrel moving mechanism 35. The barrel rear end 112a of the lens barrel 113 is positioned in front of the pack loading chamber 24 as depicted in FIG. 12. This forward position makes it possible to effect an exposure and to advance the instant photo film 13. If the camera head 112 is initially in the forward position, the barrel moving mechanism 35 is left to stand without driving. The camera head 112 remains in the forward position.

Figure 14A:
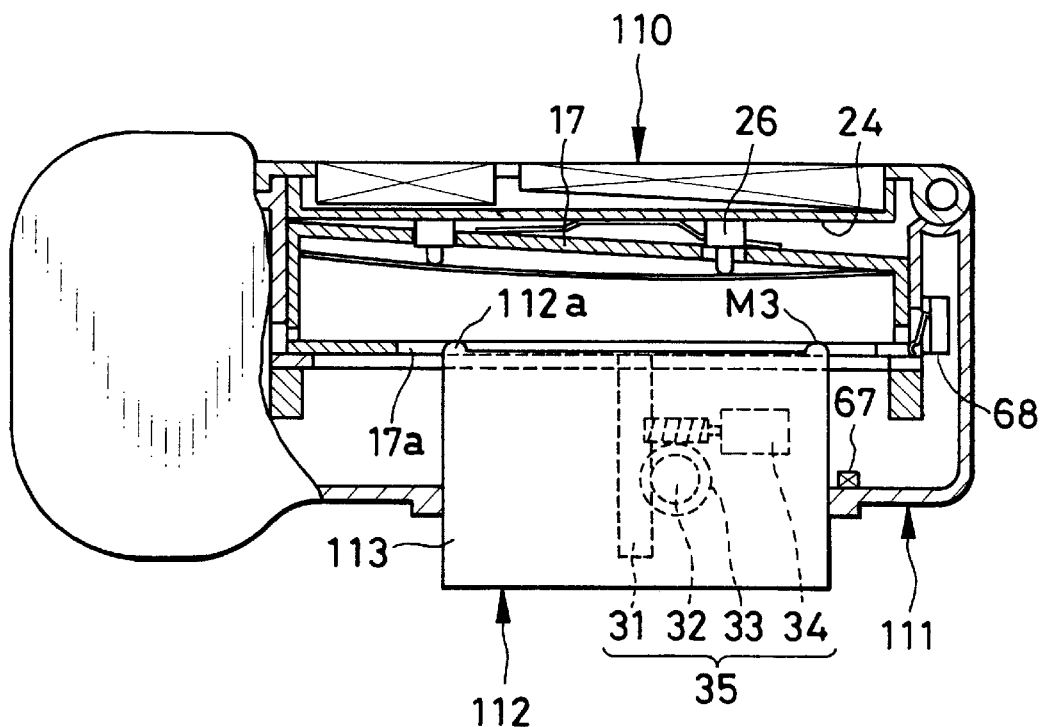
FIG. 14A is an explanatory view in horizontal section, illustrating the instant camera of which a lens barrel is in a middle position.

The system controller 120 monitors the outputs of the sensors, and causes the lens barrel 113 to move according to the outputs. When the pack chamber lid 118 is open, the system controller 120 drives the barrel moving mechanism 35 to move the camera head 112 toward the middle position M3. When the camera head 112 is in the middle position M3, the system controller 120 stops the barrel moving mechanism 35. As illustrated in FIG. 14A, the camera is ready to be loaded with the instant photo film pack 17, as the barrel rear end 112a of the lens barrel 113 does not contact the instant photo film 13.

Figure 14B:
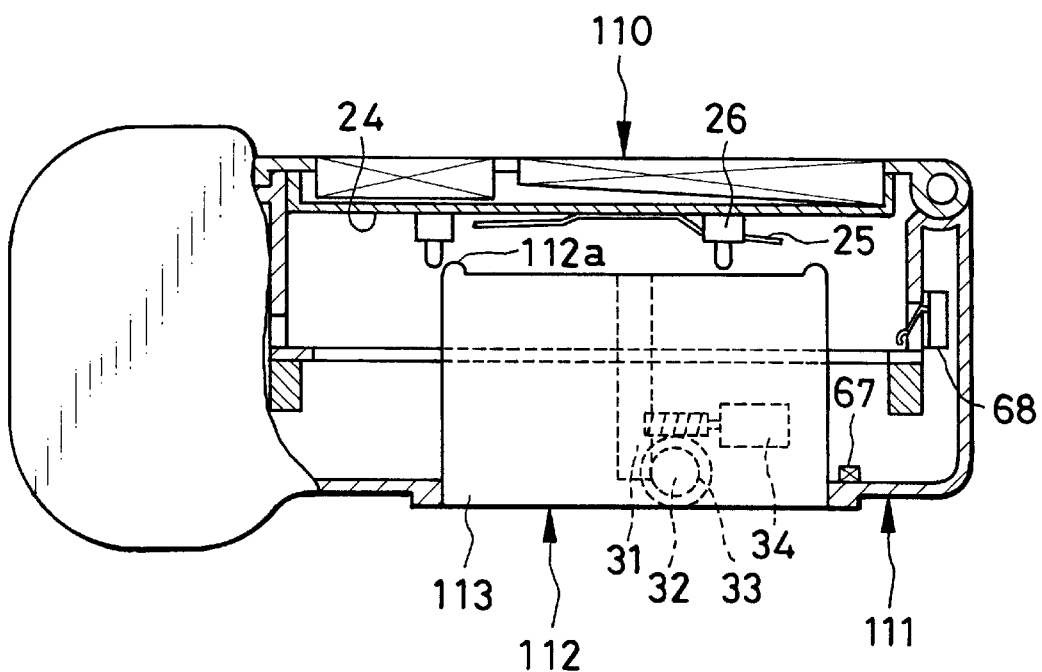
FIG. 14B is an explanatory view in horizontal section, illustrating the instant camera of which the lens barrel is in a collapsed position.

When the system controller 120 recognizes that the pack chamber lid 118 has become closed, the system controller 120 monitors existence and absence of the instant photo film pack 17. If the instant photo film pack 17 does not exist, then the system controller 120 causes the barrel moving mechanism 35 to move the lens barrel 113 toward the collapsed position. When the camera head 112 comes to the collapsed position, the system controller 120 stops the barrel moving mechanism 35. In FIG. 14B, the barrel rear end 112a of the lens barrel 113 comes to a position inside the pack loading chamber 24. A front face of the camera head 112 comes flush with a front face of the camera body 111, to minimize the contour size of the instant camera 110. When the pack chamber lid 118 is closed, the camera head 112 is set to the middle position M3 if the instant photo film pack 17 exists in the instant camera 110.

The release button 10 is depressed while the instant photo film pack 17 is loaded. The system controller 120 drives the barrel moving mechanism 35 to move the lens barrel 113 to the forward position. When the camera head 112 comes to the forward position, the system controller 120 stops the barrel moving mechanism 35. Therefore, a sufficient focal length can be obtained. Furthermore, the taking lens 114 is moved in the optical axis direction for focusing. The shutter mechanism 116 is opened and closed. Object light passes the taking lens 114 and exposes the instant photo film 13.

After the exposure is taken, the system controller 120 drives the barrel moving mechanism 35 to move the lens barrel 113 toward the middle position M3. When the camera head 112 comes to the middle position M3, the system controller 120 stops the barrel moving mechanism 35. At the same time, the claw mechanism 30 is caused to push the instant photo film 13 being exposed toward the spreader rollers 14. The spreader rollers 14 and the claw mechanism 30 are driven in synchronism. The spreader rollers 14 advance the instant photo film 13 and also spread the processing solution. Then a predetermined time elapses before an image appears in the exposure surface of the instant photo film 13.

Consequently, the lens barrel 113 is set in the middle position M3 or collapsed position if no exposure is intended. A protruding degree of the camera head 112 from the front face of the camera body 111 is reduced. Portability of the instant camera 110 can be good when not in use. If the pack chamber lid 118 is open, there is no operation of driving the camera head 112 or exposing the instant photo film 13 even when the release button 10 is depressed. If the instant photo film pack 17 does not exist, there is no operation of driving or exposing, even when the release button 10 is depressed.

In the above embodiments, the recording medium is the instant photo film of the mono-sheet type. However, recording medium in the present invention may be thermosensitive recording paper or film, PPC (plain paper copier) paper, specialized paper coated with a surface coating, OHP (overhead projector) sheet, or the like. If thermosensitive recording paper is used, a thermal head is driven for thermal recording. If PPC paper is used, recording may be ink jet printing, wax transfer thermal recording, thermal transfer recording, or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera in which a recording medium pack for containing a sheet-shaped recording medium is used, said camera comprising:
    a pack loading chamber for being loaded with said recording medium pack;
    a front opening through which said pack loading chamber is open in a forward direction;
    a taking lens for focusing of an image of an object to be photographed; and
    a lens barrel for accommodating said taking lens, said lens barrel being disposed to extend in said forward direction from said pack loading chamber, having a barrel rear end, and inserted through said front opening, wherein said barrel rear end is disposed in said pack loading chamber.

2. A camera as defined in claim 1, further comprising a barrel moving mechanism for moving said lens barrel between a collapsed position and a forward position in an optical axis direction, wherein said barrel rear end, when said lens barrel is in said collapsed position, is located inside said pack loading chamber, and when said lens barrel is in said forward position, is located in front of said pack loading chamber.

3. A camera as defined in claim 2, wherein said recording medium pack includes a pack opening formed in a wall opposed to said recording medium;
    wherein said pack loading chamber is loaded with said recording medium pack with said pack opening oriented in said forward direction, and said barrel rear end is movable into and out of said recording medium pack through said front opening and said pack opening.

4. A camera as defined in claim 3, wherein a middle position is predetermined between said collapsed position and said forward position, and said lens barrel, when set in said middle position or set in front of said middle position, allows loading and unloading of said recording medium pack to said pack loading chamber.

5. A camera as defined in claim 4, further comprising:
    a pack detector for detecting loading of said recording medium pack in said pack loading chamber, to generate a detection signal;
    a control unit for controlling said barrel moving mechanism, to set said lens barrel in said collapsed position when said detection signal does not exist, and to inhibit said lens barrel from being set behind said middle position when said detection signal exists, said barrel rear end being prevented from contacting said recording medium.

6. A camera as defined in claim 3, wherein said camera is a printer built-in type, and further comprising:
    an image sensor for receiving light of said object from said taking lens, to output a pick-up signal; and
    a printing head for printing said image to said recording medium according to said pick-up signal.

7. A camera as defined in claim 6, wherein said printing head extends in a main scan direction;
    further comprising a recording medium moving mechanism for moving said recording medium in a sub scan direction with respect to said printing head in printing.

8. A camera as defined in claim 6, wherein said printing head extends in a main scan direction;
    further comprising a printing head moving mechanism for scanning said printing head in a sub scan direction with respect to said recording medium in printing.

9. A camera as defined in claim 8, wherein said printing head moves said printing head in a head moving path in front of said pack loading chamber;
    when said lens barrel is in said middle position, said barrel rear end is located inside said head moving path.

10. A camera as defined in claim 6, further comprising a control unit for inhibiting said printing head from printing when said lens barrel is in said collapsed position or said middle position.

11. A camera as defined in claim 10, wherein said recording medium is an instant photo film.

12. A camera as defined in claim 3, wherein said camera is an instant camera, said recording medium is an instant photo film;
    further comprising a shutter mechanism for providing an exposure to an exposure surface of said instant photo film through said front opening.

13. A camera as defined in claim 12, wherein said recording medium pack contains a stack of plural instant photo films;
    further comprising:
        an advancing mechanism for advancing said instant photo film from said recording medium pack after an exposure;

spreader rollers for nipping and feeding said instant photo film being advanced, and for spreading processing solution in feeding to an outside of said pack loading chamber; and a control unit for controlling said advancing mechanism and said lens barrel, to set said lens barrel in said forward position before a start of actuating said advancing mechanism.

14. A camera as defined in claim 3, further comprising an externally operable member being movable or rotatable;

wherein when said externally operable member is moved or rotated, said barrel moving mechanism moves said lens barrel in said optical axis direction.

15. A camera in which a recording medium pack for containing a sheet-shaped recording medium is used, wherein said recording medium pack includes a pack opening formed in a wall opposed to said recording medium, said camera comprising:

a pack loading chamber for being loaded with said recording medium pack with said pack opening oriented in a forward direction;

a front opening through which said pack loading chamber is open in said forward direction;

a taking lens for focusing of an image of an object to be photographed; and a lens barrel for accommodating said taking lens, said lens barrel being disposed to extend in said forward direction from said pack loading chamber, having a barrel rear end, and inserted through said front opening and said pack opening, wherein said barrel rear end is disposed in said recording medium pack.

16. A camera of a printer built-in type, in which a recording medium pack for containing a sheet-shaped recording medium is used, said camera comprising:

a taking lens;

a lens barrel for accommodating said taking lens, having a barrel rear end;

an image sensor for receiving object light from said taking lens, to output a pick-up signal;

a pack loading chamber, disposed behind said lens barrel, for being loaded with said recording medium pack;

a front opening through which said pack loading chamber is open in a forward direction;

a printing head, disposed to extend in a main scan direction, for printing an image to said recording medium through said front opening according to said pick-up signal;

a printing head moving mechanism for scanning said printing head in a head moving path in a sub scan direction with respect to said recording medium;

a barrel moving mechanism for moving said lens barrel between a collapsed position and a forward position in an optical axis direction, wherein said lens barrel, when in said collapsed position, protrudes into said head moving path, and said barrel rear end, when said lens barrel is in said collapsed position, is located inside said pack loading chamber, and when said lens barrel is in said forward position, is located in front of said pack loading chamber.

17. A camera as defined in claim 16, wherein a middle position is predetermined between said collapsed position and said forward position, and said lens barrel, when set in said middle position or set in front of said middle position, allows loading and unloading of said recording medium pack to said pack loading chamber;

further comprising:

a pack detector for detecting loading of said recording medium pack in said pack loading chamber, to generate a detection signal;

a control unit for controlling said barrel moving mechanism, to set said lens barrel in said collapsed position when said detection signal does not exist, and to inhibit said lens barrel from being set behind said middle position when said detection signal exists.

18. A camera as defined in claim 17, wherein said control unit inhibits said printing head from printing when said lens barrel is in said collapsed position or said middle position.

* * * * *